Figure 1:
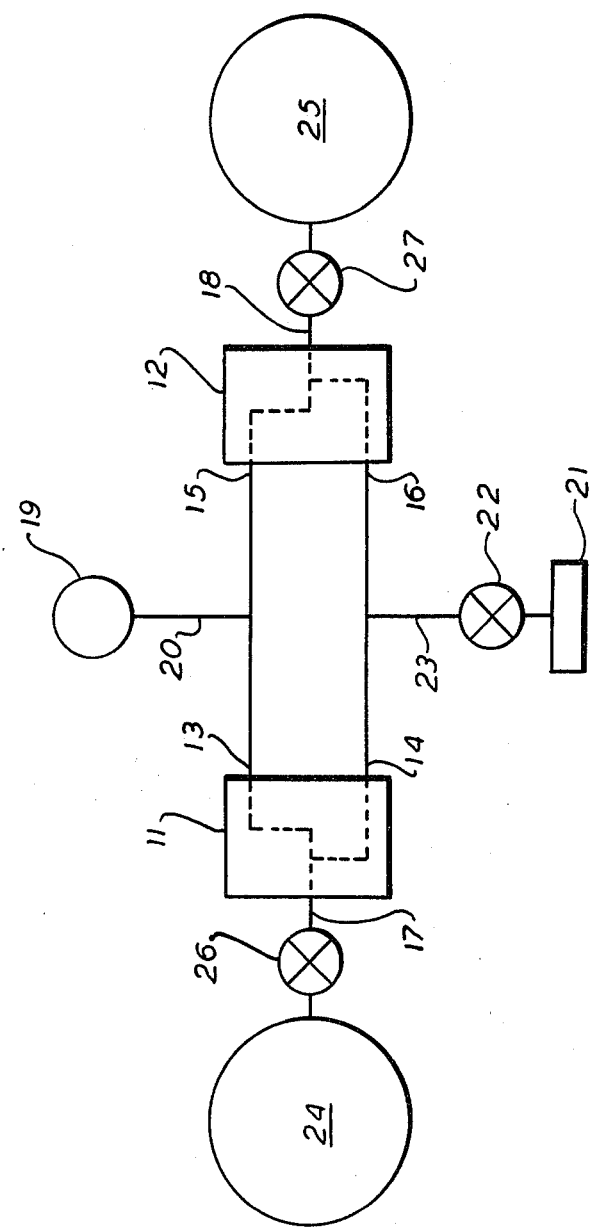

United States Patent [19]

Stefiuk

[11] 4,333,503
[45] Jun. 8, 1982

[54] SYSTEM AND METHODS WITH SCAVENGING CAPABILITIES FOR SIMULTANEOUSLY FILLING AND EVACUATING A PLURALITY OF SEPARATE PRESSURE VESSELS

[76] Inventor: John Stefiuk, R.D. #1 Bunker Hill Rd., Princeton, N.J. 08540

[21] Appl. No.: 116,881

[22] Filed: Jan. 30, 1980

[51] Int. Cl.³ ............................................. B65B 31/00
[52] U.S. Cl. ........................................... 141/8; 141/66
[58] Field of Search ............... 141/1, 4, 5, 7, 8, 47, 141/48, 61, 65, 66

[56] References Cited

U.S. PATENT DOCUMENTS

| | | | |
|---|---|---|---|
| 2,939,938 | 6/1960 | Ravich | 141/66 X |
| 3,744,537 | 7/1973 | Cole | 141/65 X |
| 4,027,707 | 6/1977 | Maskell | 141/66 |
| 4,120,331 | 10/1978 | Arivanek | 141/66 |

Primary Examiner—Frederick R. Schmidt
Attorney, Agent, or Firm—Carella, Bain, Gilfillan & Rhodes

[57] ABSTRACT

A system and methods with scavenging capabilities for simultaneously filling and evacuating a plurality of separate pressure vessels including valved conduits interconnecting a source of pressurized fluid and a source of vacuum separately to at least two pressure vessels whereby while one vessel is being filled the other is being evacuated and means to connect an evacuated tank to portions of the system for the purpose of using the vacuum therein to scavenge residue gas in said portions.

4 Claims, 1 Drawing Figure

SYSTEM AND METHODS WITH SCAVENGING CAPABILITIES FOR SIMULTANEOUSLY FILLING AND EVACUATING A PLURALITY OF SEPARATE PRESSURE VESSELS

BACKGROUND OF THE INVENTION

The filling of portable pressure vessels with pressurized fluids, particularly gases, is a time-consuming and frequently labor intensive operation. In the case of gases, the pressure vessel is frequently first evacuated prior to filling for various reasons. Therefore, the pressure vessel must first be connected to a source of vacuum. Usually, the pressure vessel is equipped with its own inlet and outlet valve. The vacuum line is connected to the outlet of the vessel valve for the purpose of drawing down the pressure therein to the desired extent. The vessel valve is then closed and the source of vacuum disconnected from the outlet of that valve.

The vessel is then connected through its own valve to a source of pressurized gas as for instance freon. After the vessel has been filled to the desired degree, the vessel valve is closed and the source of high pressure gas disconnected.

Usually, evacuation and filling are done sequentially. If a system were to provide the capability of evacuating one tank while simultaneously filling another tank, the time required could be drastically reduced. Nevertheless, such a system, which if kept to a minimum expense would involve manually operated valves is likely to involve a substantial length of conduit between the valve system and the vessel being filled. In many instances the gas is sufficiently costly and sufficiently voluminous to warrant means for recovery.

It is among the objects and advantages of the present invention to provide both a system and method with scavenging capabilities for simultaneously filling and evacuating at least two separate pressure vessels simultaneously.

Another object of the present invention is to provide means for scavenging residual gas left in a portion of the system after filling.

Yet another object of the present invention is to employ the vacuum in the evacuated tank to scavenge residual gas in other portions of the system before initiating the filling of the evacuated tank.

SUMMARY OF THE INVENTION

A system with scavenging capability for simultaneously filling a first vessel with a pressurized fluid and evacuating a second vessel comprising at least two multi-position valve means, each valve means having at least two inlets and at least one outlet; one of each of the inlets of each said multi-position valve means connected respectively to a source of fluid under pressure and a source of vacuum, the inlets of each multi-position valve means connected to the source of vacuum being also operatively connected to each other, and; an outlet of each of the multi-position valve means being operatively connected to a vessel valve means which is in turn connectable to a vessel; each multi-position valve means being operable to connect the vessel valve means to which it is connected to the other vessel valve means through the other multi-position valve means.

A method for simultaneously filling and evacuating at least two pressure vessels in a system including a source of fluid under pressure, a source of vacuum, each of said sources connected to each vessel through separate intermediate valve means and separate vessel valve means comprising; connecting a first vessel to a source of fluid under pressure; connecting a second vessel to a source of vacuum during at least a portion of the period during which the first vessel is connected to the source of fluid under pressure; disconnecting the first and second vessels from the respective sources; connecting the second vessel to the first vessel valve means through both intermediate valves for purposes of scavenging and; disconnecting the second vessel from the first vessel valve means and connecting said second vessel to the source of fluid under pressure; disengaging the first vessel from the system, engaging an empty vessel in its place and connecting the empty vessel to the source of vacuum during at least a portion of the period during which the second vessel is connected to the source of fluid under pressure.

PREFERRED EMBODIMENT OF INVENTION

The objects and advantages aforesaid as well as other objects and advantages may be achieved by the system and methods hereinafter described. A preferred embodiment of the system being illustrated schematically in FIG. 1 of the drawings appended hereto.

Referring now to FIG. 1, the system comprises a pair of multi-position valves 11 and 12. Each of the valves 11 and 12 is provided with a pair of inlets 13, 14, and 15, 16 and a single outlet, respectively 17 and 18.

Inlets 13 and 15 of the respective valves 11 and 12 are connected to a source of high pressure gas 19 through an appropriate conduit system 20. Similarly, inlets 14 and 16 of valves 11 and 12, respectively, are connected to a source of vacuum 21 through a valve 22 and an appropriate conduit system 23.

Each of the outlets 17 and 18 are connectable to pressure vessels 24 and 25, respectively. The pressure vessels 24 and 25 are equipped with vessel valves respectively 26 and 27.

Valves 11 and 12 are preferably of the multi-position type in which the opening of one of the inlets simultaneously closes the other inlet and vice-versa. Nevertheless, valves 11 and 12 may be independent and separately operable valves or independent valves but simultaneously actuated by one actuating device.

Frequently, the distance between valves 11 and 12 and the loading or evacuating stations to accommodate vessels 24 and 25 is relatively long. Therefore it is desirable to scavenge residual gas in the conduits between the vessel valves 26 and 27 and the system defined by the multi-position valves 11 and 12.

In operation, vessels in positions of vessels 24 and 25 may be alternately filling and evacuating simultaneously. Additionally, at the end of the filling and evacuating cycles, the vacuum in the evacuated tank may be employed to scavenge residual gas in the conduit connecting the other tank with its multi-position valve.

Table I below sets forth the positions of various valves identified in FIG. 1 above for the different phases of operation with respect to both vessels 24 and 25.

TABLE I

| | VESSEL 24 | VESSEL VALVE 26 | VALVE 11 | VALVE 22 | VALVE 12 | VESSEL VALVE 27 | VESSEL 25 |
|---|---|---|---|---|---|---|---|
| 1. | EVACUATING | OPEN | OPEN OUTLET 14 | OPEN | OPEN OUTLET 15 | OPEN | FILLING |
| 2. | SCAVENGING | OPEN | OPEN OUTLET 14 | CLOSED | OPEN OUTLET 16 | CLOSED | SCAVENGING |
| 3. | | | | | | | END/START |
| 4. | FILLING | OPEN | OPEN OUTLET 13 | OPEN | OPEN OUTLET 16 | OPEN | EVACUATING |
| 5. | SCAVENGING | CLOSED | OPEN OUTLET 14 | CLOSED | OPEN OUTLET 16 | OPEN | SCAVENGING |
| 6. | END/START | | | | | | |
| 1. | EVACUATING | OPEN | OPEN OUTLET 14 | OPEN | OPEN OUTLET 15 | OPEN | FILLING |
| 2. | SCAVENGING | OPEN | OPEN OUTLET 14 | CLOSED | OPEN OUTLET 16 | CLOSED | SCAVENGING |
| 3. | | | | | | | END/START |
| 4. | FILLING | OPEN | OPEN OUTLET 13 | OPEN | OPEN OUTLET 16 | OPEN | EVACUATING |
| 5. | SCAVENGING | CLOSED | OPEN OUTLET 14 | CLOSED | OPEN OUTLET 16 | OPEN | SCAVENGING |
| 6. | END/START | | | | | | |

In TABLE I, under the columns identified "VALVE 11 OPEN OUTLET" and "VALVE 12 OPEN OUTLET", the outlet number identified is the open position and the opposite outlet is in the closed position.

Although unshown in FIG. 1, optionally a valve may be introduced between the source of pressurized gas 19 and the conduit system 20 but is unnecessary in the configuration illustrated in FIG. 1.

Additionally, it is apparent that valves 11, 12 and 22 can be operated automatically rather than manually. The sequencing as illustrated in TABLE I is sufficiently simple that it is within the ordinary skill of one skilled in the art to provide such automated means.

Additionally, automated means may be provided for operation of valves 26 and 27 normally associated with vessels 24 and 25. Although more complicated than automating the inter-operation of valves 11, 12 and 22 the automation of valves 26 and 27 are also within the ordinary skill of one skilled in the art.

If the system confined by valves 11, 12 and 22 is made sufficiently compact, it can be easily within arm's reach of a single operator who need not move.

What is claimed is:

1. A system with scavenging capability for simultaneously filling a first vessel with a pressurized fluid and evacuating a second vessel comprising:
   (a) at least two multi-position valve means, each valve means having at least two inlets and at least one outlet;
   (b) one of each of the inlets of each said multi-position valve means connected respectively to a source of fluid under pressure and a source of vacuum, the inlets of each multi-position valve means connected to the source of vacuum being also operatively connected to each other, and
   (c) an outlet of each of the multi-position valve means being operatively connectable to at least one vessel valve means which is in turn proximal to and connectable to a vessel;
   (d) each multi-position valve means being operable to connect the vessel valve means to which it is connected to the other vessel valve means through the other multi-position valve means.

2. A system with scavenging capability for simultaneously filling a first vessel with a pressurized fluid and evacuating a second vessel, in accordance with claim 1, and
   (a) valve means intermediate the source of vacuum and each of the said multi-position valve means.

3. A system with scavenging capability for simultaneously filling a first vessel with a pressurized fluid and evacuating a second vessel in accordance with claims 1 or 2 in which each multi-position valve means has two inlets and one outlet and being operable to connect alternately each inlet with an outlet.

4. A method for simultaneously filling and evacuating at least two pressure vessels in a system including a source of fluid under pressure, a source of vacuum, each of said sources connected to each vessel through separate intermediate valve means and separate vessel valve means comprising,
   (a) connecting a first vessel to a source of fluid under pressure,
   (b) connecting a second vessel to a source of vacuum during at least a portion of the period during which the first vessel is connected to the source of fluid under pressure,
   (c) disconnecting the first and second vessels from the respective sources,
   (d) connecting the second vessel to the first vessel valve means through both intermediate valves for purposes of scavenging and
   (e) disconnecting the second vessel from the first vessel valve means and connecting said second vessel to the source of fluid under pressure,
   (f) disengaging the first vessel from the system, engaging an empty vessel in its place and connecting the empty vessel to the source of vacuum during at least a portion of the period during which the second vessel is connected to the source of fluid under pressure.

* * * * *